United States Patent
Hinkel

(10) Patent No.: US 9,948,900 B2
(45) Date of Patent: Apr. 17, 2018

(54) METHOD FOR THE CONFIGURATION OF CAMERAS AND THE LIKE

(71) Applicant: MOBOTIX AG, Winnweiler (DE)

(72) Inventor: Ralf Hinkel, Hoeringen (DE)

(73) Assignee: MOBOTIX AG, Winnweiler (DE)

( * ) Notice: Subject to any disclaimer, the term of this patent is extended or adjusted under 35 U.S.C. 154(b) by 129 days.

(21) Appl. No.: 14/750,105

(22) Filed: Jun. 25, 2015

(65) Prior Publication Data

US 2016/0100134 A1 Apr. 7, 2016

(30) Foreign Application Priority Data

Oct. 6, 2014 (DE) .................. 10 2014 220 176
Oct. 14, 2014 (DE) .................. 10 2014 220 777

(51) Int. Cl.
- *H04N 7/18* (2006.01)
- *H04N 9/47* (2006.01)
- *H04N 5/232* (2006.01)

(52) U.S. Cl.
CPC ......... *H04N 7/181* (2013.01); *H04N 5/23206* (2013.01)

(58) Field of Classification Search
None
See application file for complete search history.

(56) References Cited

U.S. PATENT DOCUMENTS

| | | | |
|---|---|---|---|
| 7,403,487 B1* | 7/2008 | Foladare | H04L 41/0896 370/232 |
| 9,454,884 B1* | 9/2016 | Chen | G06F 17/30256 |
| 2001/0033330 A1* | 10/2001 | Garoutte | G06K 9/00771 348/153 |
| 2003/0210329 A1* | 11/2003 | Aagaard | H04N 7/181 348/159 |
| 2004/0080618 A1* | 4/2004 | Norris | G06K 9/00771 348/207.1 |
| 2007/0201860 A1* | 8/2007 | Schmid | B60R 1/00 396/419 |
| 2010/0194882 A1* | 8/2010 | Belsarkar | G08B 13/19602 348/143 |

(Continued)

*Primary Examiner* — Talha M Nawaz
(74) *Attorney, Agent, or Firm* — Oblon, McClelland, Maier & Neustadt, L.L.P.

(57) ABSTRACT

The present invention relates to a system 1 comprising network-enabled surveillance cameras (PLC1-10, OfficeC1-OfficeC20 and SCC1-10). These cameras can be configured via the network with respect to a plurality of parameters such as their resolution "RES", frame rate FR and microphone sensitivity $\mu$.

Figure 1:
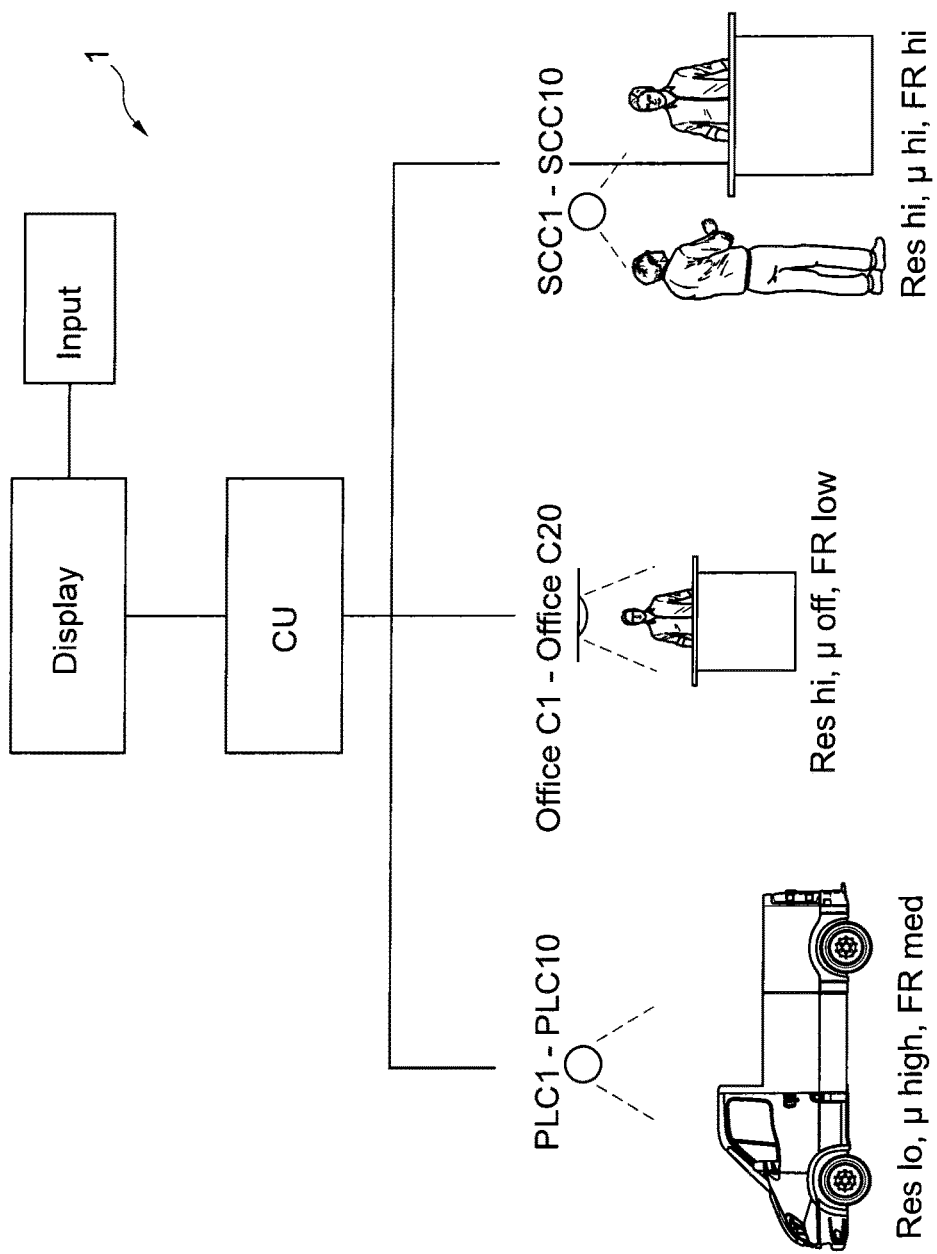

A method for configuring these cameras is disclosed, wherein a central unit CU determines values for a plurality of configuration parameters for each of a plurality of network-enabled cameras, camera groups are automatically formed among the plurality of network-enabled cameras on the basis of the configuration parameter values, camera representations are displayed to the user based on the grouping, a user input for changing the assignment of a camera from a first group to a second group is detected, a reconfiguration instruction for changing at least one configuration parameter based on the group assignment is automatically generated in response to said user input and the reconfiguration instruction is sent to the camera via the network.

23 Claims, 3 Drawing Sheets

(56) References Cited

U.S. PATENT DOCUMENTS

| | | | | |
|---|---|---|---|---|
| 2013/0076522 A1* | 3/2013 | Csaszar | ................ | G06K 7/0008 340/686.1 |
| 2013/0076617 A1* | 3/2013 | Csaszar | ................... | G06F 3/017 345/156 |
| 2013/0225199 A1* | 8/2013 | Shaw | .................... | H04W 24/00 455/456.1 |
| 2015/0371082 A1* | 12/2015 | Csaszar | .............. | G06K 9/00355 382/103 |
| 2015/0371083 A1* | 12/2015 | Csaszar | .............. | G06K 9/00355 382/103 |

* cited by examiner

METHOD FOR THE CONFIGURATION OF CAMERAS AND THE LIKE

The present invention relates to the generally claimed subject-matter and thus relates to the configuration of network-enabled cameras as well as field bus devices and the like.

Network-enabled cameras are meanwhile widely used for surveillance purposes. In some cases, the overall systems are highly complex. Thus, a plurality of cameras is arranged in various places for the surveillance of prisons, airports, railway stations, sports stadiums and other public buildings. In order to be able to actually increase security with such a plurality of cameras, the cameras must be carefully configured to ensure that potentially dangerous situations lead to a suitable alarm in a surveillance control center, that supporting staff is alarmed in time, etc. The absence of a proper configuration leads to gaps in security which possibly are not noticed prior to an emergency situation.

It is therefore desirable that a configuration is provided which avoids misconfigurations even with complex systems. On the one hand, such a configuration should be easy to perform for the person responsible for the implementation of a system, i.e. it must be possible to implement the configuration easily and in such a way that any errors possibly still existing will be recognized quickly, and, on the other hand, it must be ensured that even where systems are complex, a complete and useful configuration thereof is effected. Especially in case of complex systems, the effort required by conventional methods of individual configuration of cameras will place a massive burden on the person responsible for installation even where the system is well structured, because at best, existing configuration settings will be configured or transferred from camera to camera.

US 2008/0098309 A1 discloses a method for managing virtual machines and hosts by property. It is inter alia mentioned that it is not uncommon for system administrators to create a hierarchical structure of groups into which virtual machines and mainframe computers can be placed. It is stated that in a system virtual machines and hosts may be browsed with respect to specific properties and that the results of this browsing can be represented by a hierarchical structure. It is stated that managing virtual machines and hosts by property can be performed with other computer system configurations, including consumer electronics, and the like.

Furthermore, it is known from U.S. Pat. No. 7,496,583 B2 to consider a property tree for data stored in a data storage subsystem. Information regarding the selection of one or more data items is to be received and, in response to user input, metadata properties of stored data are to be modified.

Cameras have to be configured with respect to a plurality of configuration parameters. Among those are for example, if configuring is not done automatically (with permitting an automatic configuration e.g. by setting ["config value=AutomaticConfigPermitd"] being considered to be a configuration value as well where applicable): color temperature; PTZ (Pan-TiltZoom) parameters; playback volume of an integrated loudspeaker; sensitivity of an integrated microphone; geometric and/or achromatic image restitution; vignetting correction; IP address; frame rate; image resolution; alarm signal target for remote alarming, (e.g. by way of an email address), in particular under specific alarm-triggering conditions, so that, depending on the cause of the alarm, different persons or groups of persons can be alerted, such as a fire department, police, on-site security, etc.; type of alarm; place where data is temporarily stored; frequency with which data is to be stored at a place outside of the camera; storage mode; storage format; network; communication protocol; data format of an audio/video stream, for example, based on user-specific video encoding, such as MXPEG, or based on generally used encoding, such as H.264.

It is the object of the present invention to provide novelties for industrial application. This object is achieved by the independent claims. Preferred embodiments are found in the dependent claims.

Thus, a first basic concept of the invention consists in proposing a method for configuring network-enabled cameras which are configurable via a network with regard to a plurality of parameters, wherein values for a plurality of configuration parameters for each of a plurality of network-accessible cameras are determined using a central unit, camera groups among the plurality of network-accessible cameras are formed based on the configuration parameter values, and the cameras are displayed to the user according to the groups, a user input for changing the group assignment of a camera from a first group to a second group is detected, in response to the user input, a reconfiguration command for changing at least one configuration parameter based on the change in group assignment is automatically generated, and the reconfiguration command is sent to the camera via the network.

It should be noted that there could optionally be a plurality of units or terminals from which the cameras could be accessed for reconfiguration. In such a case it can either be checked in the accessible network whether a terminal has already executed a reconfiguration or is in the process of executing a reconfiguration. In this way, collisions can be prevented. Alternatively and/or additionally it would be possible to block cameras for other configuration accesses as soon as e.g., a query for configuration parameters has started. It would also be possible, for example, to priorize user rights or the like, so that an administrator granted with higher user rights but starting configuring the system later will be given priority and will be able to control and/or cancel and/or terminate and/or otherwise prevent a process during which another person having lower rights or a lower priorization effects a configuration. It should be noted that, optionally, when a camera is configured it is possible to require and set a minimum priorization or authorization for a later reconfiguration, which is particularly useful in systems for which several administrators have access rights. It should be further noted that where, at the beginning of a (re)configuration, cameras are blocked against access by third parties it is possible to optionally provide a time limit for blocking in order to permit access to the camera(s) again if no signal is received from the blocking CU over a specified period of time. In such a case, however, it is possible for the blocking CU to regularly send a refreshment signal to the cameras while the work is being done in order to prevent an unintentional expiry of the blocking time.

Thus, the grouping of the network cameras based on configuration parameter values firstly enables a dynamic display which no longer follows a scheme based on a structurally defined system, such as floors or the like (albeit names indicating such definition can be assigned to cameras), but which is capable of dynamically adjusting to each parameter to be displayed.

The group to be displayed can, e.g., be determined automatically, e.g. when unconfigured cameras in the system are recognized, and/or can be determined in a user-defined manner, e.g. by moving a pointer, such as a mouse over a screen or a finger over a touch screen, on either of which screen symbols for the respective configuration parameters can be found and selected.

Once such a selection has been made and the corresponding group is displayed or, optionally, an automatic grouping and display has been effected, e.g. because it was automatically recognized that although all cameras differ in many of the considered configuration parameters, some few configuration parameters just adopt very few of the possible configuration values in the overall system, it is possible to permit a change of the grouping in order to instruct a reconfiguration.

It should be noted that optionally "not defined" can be permitted as a configuration parameter value. This is especially useful where different types of cameras are read out and particular types of these cameras do not allow configuration of certain parameters, for example because the respective hardware simply is not present in the particular camera. For example in a large surveillance system, both cameras with microphone and cameras without microphone might be used; in the cameras without microphone it is possible to have a parameter value of "not available" or "not defined" as parameter value for the microphone sensitivity. In case a query for configuration parameters in such cameras does not yield a value it can be previously specified that "not defined" is assigned as parameter.

It should be also noted that the invention is particularly useful in systems in which a plurality of different cameras are arranged, in particular cameras which require access via different protocols and/or wherein specific configuration parameter values may fall into differently defined intervals. In such a case, the central unit can automatically implement a respective suitable communication protocol, i.e. depending on the camera type and/or the camera product series etc., "translate" possible configuration parameter values and/or assign the value "not defined" to parameters not defined in individual cameras, i.e parameters which can therefore not be queried. Thus, after a parameter value for configuring a camera has been determined, it will depend on the camera, the manufacturer of the camera, etc. what the associated configuring message sent to the camera looks like.

Where configuration parameter values are translated for grouping, this can be done on the basis of linear conversion, typically by multiplication or division, possibly with addition or subtraction of an offset. If, for example, the microphone sensitivity of a first camera type present in the system can be set from 1 to 32 and that of another camera type from 1 to 128, the corresponding microphone sensitivity parameter values of the first camera type can be multiplied by a factor 4; subsequently, it is optionally possible to determine suitable intervals. If, however, a sensitivity curve is non-linear or if both sensitivity curves are differently non-linear, it is possible to use a "translation" for adjustment in a different manner, in particular by recourse to a (respective) lookup table for a given camera type. It should be noted that the above information on the conversion and/or translation of microphone sensitivity is used here by way of example only and that such methods are applicable to other parameter values as well.

The proposed dynamic grouping allows it to quickly check whether the assignment of a camera to a particular group is useful or whether a camera deviates from a typical configuration, for example in view of a previous configuration error or because it has been newly integrated into a system and has not yet been configured. An indication for such deviation can be that the group to which a particular camera is assigned is very small. This can be made apparent by displaying a plurality of groups together with their respective sizes. For example, if all cameras of a very large system, such as an airport, have a configuration with which they provide images at the highest resolution or, possibly, at almost the highest resolution due to edge cropping, and if some very few cameras in this airport or airport area provide images with very low resolution, this indicates a possible configuration error in the low resolution cameras. By displaying separate groups, the corresponding cameras which provide low image resolution will immediately be noticed.

When an administrator or the like notices that a camera needs to be reconfigured, this person can simply assign the camera to another group, and according to an embodiment of the invention, it will then automatically be determined which configuration parameters of the camera to be reassigned have to be changed for obtaining the same configuration as cameras in that group to which the camera is to be assigned; a corresponding reconfiguration instruction to the camera will then automatically be generated, and a reconfiguration instruction can be sent over the network. It should be noted that, optionally, several cameras may be simultaneously assigned to another group, e.g. by jointly moving their representations from one group to the other e.g. via dragging & dropping. Then, an appropriate reconfiguration instruction for each of these cameras will be generated automatically.

Thus, the correction of a possible error restricts itself to recognizing that a camera belongs to a very small group and—after checking—that it should better be assigned to the larger group. This is readily identifiable graphically and can easily be instructed by means of a suitable pointing device. Where specific cameras are intentionally configured differently, their listing may possibly be suppressed and/or they may be marked so that no examination is carried out as to whether or not a configuration error exists.

Since even in this case, the actual reconfiguration instruction is generated in a completely automatic manner, i.e. without further intervention, regrouping can be effected fast and therefore it is possible to quickly change the group assignment without particular concentration or prior knowledge.

Where the configuration parameters can assume a plurality of different values, e.g. with respect to microphone sensitivity, which, e.g. is adjustable between 64 steps, to make sure that, when switching between two cameras that are used under per se almost identical conditions but that are arranged at different distances from a typical sound source, such as a ticket counter or the like, the same volume level is obtained during surveillance, it can be useful to form intervals, for example for looking at a high, medium and low microphone sensitivity, and nevertheless at the same time allowing adjustment to the mentioned conditions. Such intervals may be predefined by the system; for this purpose the CU preferably contains a database with parameter intervals with which read-out camera parameters are compared. Alternatively, such intervals can be specified by the user. Thus, a grouping can relate to intervals.

Beside an undefined value indicating that a specific parameter is per se not available for a camera, it may also be useful to allow that a configuration parameter indicates that the camera has not been reconfigured since its installation but rather still has the values it left the factory with or was reset to such values. This can be effected by a single parameter, similar to a flag "already configured/not yet configured" which is set to "already configured" as soon as the first parameter has been configured and/or as soon as a particular first parameter has been configured. Alternatively, a parameter value "still unconfigured" (or, of course, a flag indicating such state) may be allowed for each of a plurality of configuration parameters in order to indicate that the respective configuration parameter has not yet been adjusted. Such still unconfigured cameras can easily be grouped and usually require reconfiguration. The fact that such separately grouped cameras automatically take over a plurality of camera parameters from one of several comparison groups allows an extremely quick, and yet reliable configuration.

The CU can determine the configuration parameter values in particular by recourse to a database in which previously determined specific values have been stored. If necessary, the previously determined values can be used from a system design, e.g. for defining suitable zoom values for specific cameras right from the start. Thus, it is possible to import values into the database. It is further possible to optionally make sure that the cameras, at the time of configuration, actually have or adopt the values stored in the database; this has the effect that a reconfiguration by the user is based on the target system, which is actually predefined, even if there has been an unauthorized and unnoticed manipulation of individual cameras. Alternatively and/or additionally it is possible to read out from the cameras the current status of the configuration parameters before starting reconfiguration. In this way it can be ensured that errors observed during operation are actually corrected. By comparison with values stored in a database, relating to what the configuration should look like or how it was previously defined, it is also possible to detect unauthorized interventions. This considerably increases security.

Groups are automatically formed when checking inhowfar cameras match with regard to the values of a particular configuration parameter. It may be advantageous to consider not just individual configuration parameters but rather a plurality of parameters, for example parameter pairs and/or parameter triples. Thus, it can, for example, be useful to work with high resolution, high frame rate and high microphone sensitivities at cash desks, to use a high image resolution but a low frame rate and a switched-off microphone in offices, and to provide for the surveillance of outdoor areas, such as car parks using high microphone sensitivities, low image resolutions and medium frame rates, since although sounds are to be detected there, the movement to be captured is of large objects only. Now, in such a system it is useful to form groups that take account of different microphone sensitivities, frame rates and image resolutions. An assignment to specific groups can be made automatically, i.e. the CU automatically assigns the cameras to a group; at the same time it can also be determined whether, for example, the microphone sensitivity is also high when a frame rate is high, while a low frame rate simultaneously indicates high microphone sensitivity. This can be done by automatic evaluation of the configuration parameters determined. In response to, e.g., a group assignment with respect to image resolution, a change in microphone sensitivity and/or frame rate can either be automatically effected or alternatively at least be offered to the user by inquiring whether such simultaneous changing of further parameters is desired. It should be noted that the determination of parameters to be simultaneously changed and the parameter target values to be observed in that case can be automatically carried out by analysis and/or prescribed by the user by defining the parameters that are to be simultaneously configured.

Alternatively and/or additionally it is possible for a user to specify target profiles to ensure that if one parameter is changed, the other parameters included in the parameter set of the profile are likewise changed. It should be noted that it is possible, for example, to specify a configuration parameter, to display the groups of matching cameras, and, if a second parameter is selected, to (dynamically) indicate how the respective groups on display are divided further. Such a display changing dynamically, e.g. in response to moving a pointer device, such as a mouse, over a specific configuration parameter, is particularly noticeable, allows that many parameters can be viewed quickly and can be presented without much effort because even very large systems will comprise but some hundreds to thousands of cameras and because their overall configuration data will thus still have a comparatively small size only, and can easily be stored in a main memory or data cache, so that even in very large systems the corresponding grouping of the configuration values previously retrieved from the network and stored in the central unit will not require any relevant expenditure of time or computing.

The display can be based on spatial grouping, e.g. in the form of columns listed side by side, of listings one below the other, on color, e.g., a colored line surrounding a preview image and/or can be done with reference to the IP address, the geographic or spatial positions of a camera, the assigned camera name or the like. The user can change the grouping by clicking on and dragging over or assigning another color. It is noted that a color frame around a camera image is sufficiently eye-catching to indicate within a spatial area characterizing a first parameter value that a second configuration parameter has a second parameter value. All in all, it is particularly advantageous if configuration parameters are not only viewed in groups yet individually, but rather configuration parameter tuples lead to grouping, for example considering pairs. In doing so, the facility of interpretation increases if empty groups are likewise displayed, displaying for example, bordered empty areas or empty columns.

The configuration parameters that can be requested and/or changed, are, for example, one of light sensitivity, color temperature, PTZ parameters, playback volume of an integrated loudspeaker, sensitivity of an integrated microphone, geometric and/or achromatic image rectification, IP address, frame rate, image resolution, alarm signal target for remote alarming, alarm triggering conditions, alarm type, condition pattern-based camera response, storage location, storage frequency, storage format, network communication protocol, data format.

Here, it should be noted that not all configuration parameters must necessarily be alterable. With regard to grouping, it may be advantageous to completely ignore specific configuration parameters, such as the IP address (in contrast to the IP address generation type such as fixed IP address or as address obtained from a DHCP server) or a tilt parameter which will routinely depend on the alignment of the camera. This can, e.g., also have been defined in the system in advance. If desired, such parameters can appear on the graphic user interface (GUI) as not clickable.

In the following, the invention will be described, by way of example only, based on the drawing.

Figure 2A:
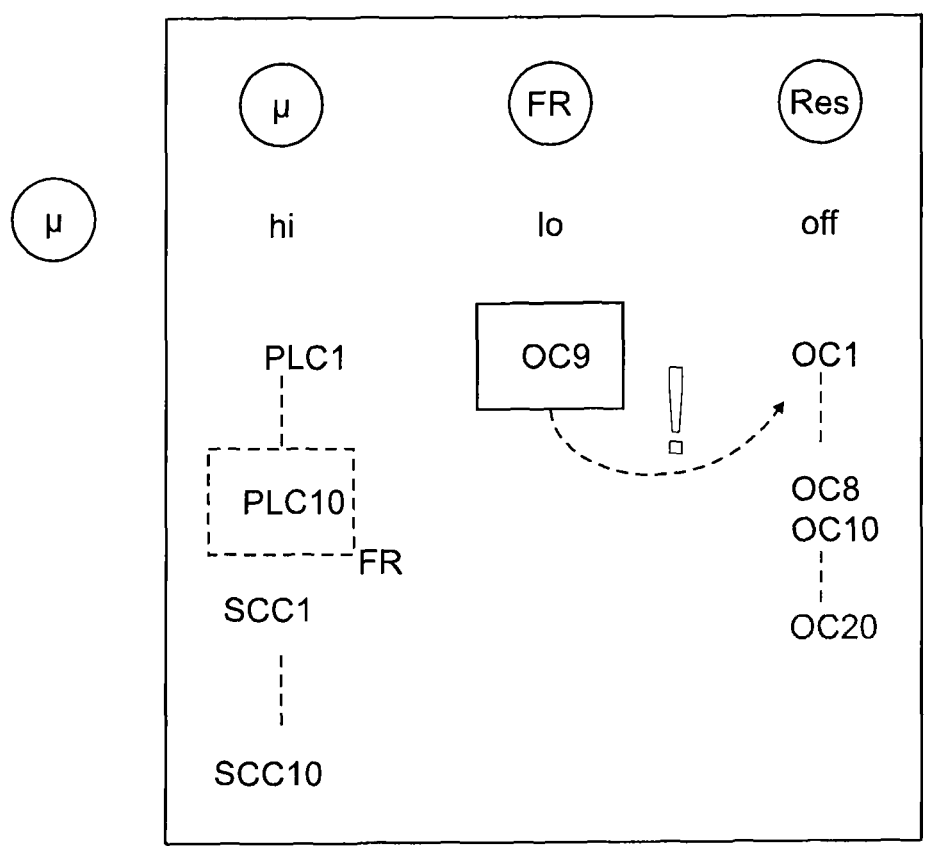
Figure 2B:
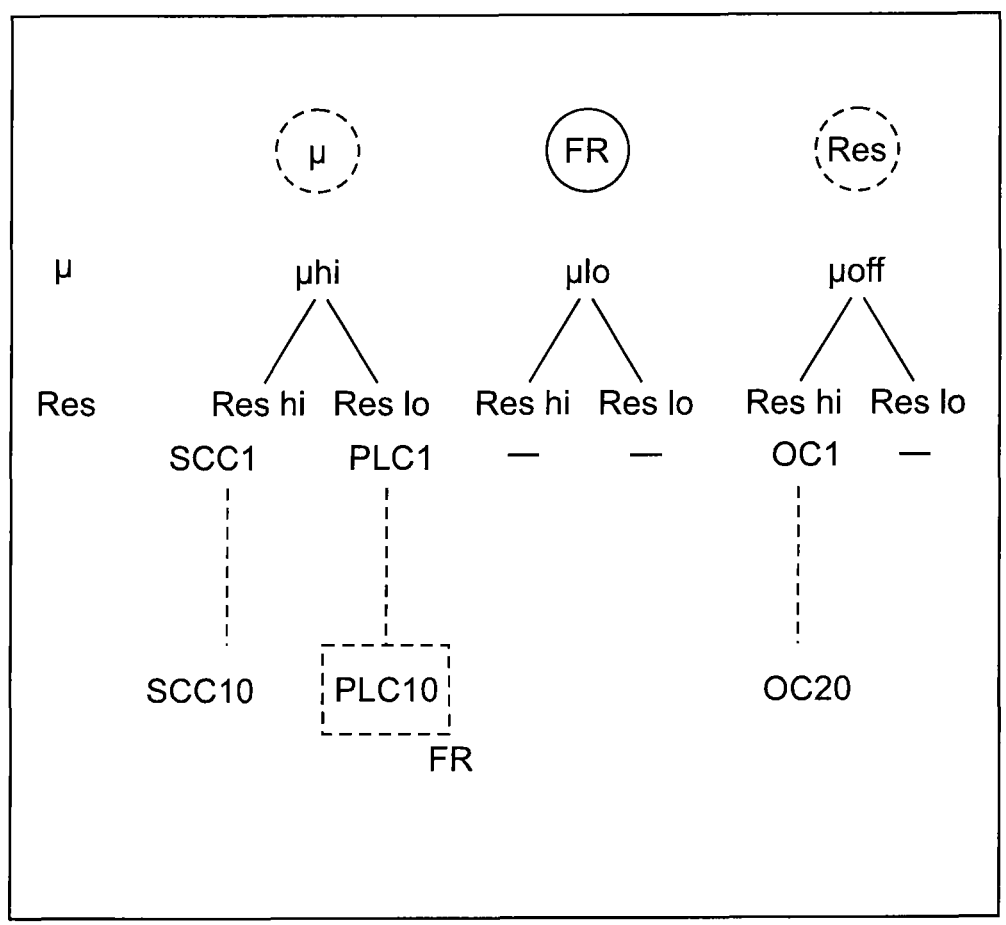

FIG. 1: a camera system for the surveillance of company premises, wherein the typical target parameter values of the respective cameras are given FIG. 2A an example for a display of the grouping based on the microphone sensitivity "μ";

FIG. 2B: an example for the further splitting of the grouping of FIG. 2B based on the image resolution "Res".

FIG. 1 shows a system 1 which is generally designated as 1, wherein a method can be used for configuring network-enabled cameras which are configurable over a network with regard to a plurality of parameters, wherein a (central) unit determines values for a plurality of configuration parameters for each of a plurality of network-enabled cameras, camera groups are (automatically) formed among the plurality of network-enabled cameras on the basis of the configuration parameter values, camera representations are displayed to the user based on the grouping, a user input for changing the assignment of a camera from a first group to a second group is detected, a reconfiguration instruction for changing at least one configuration parameter based on the group assignment is automatically generated in response to said user input and the reconfiguration instruction is sent to the camera via the network.

The system comprises a number of cameras connected to a central unit via a network, here a TCP/IP-enabled local network, which outputs data to a display means, such as a workstation, where input means, e.g. keyboard and mouse, are present. It will be appreciated that the invention can also be readily implemented when, instead of the workstation, a mobile telephone or the like is used, which, different from the typical workstation, is not locally connected via LAN according to the Ethernet protocol or the like, but via a remote wireless connection, such as UMTS, an internet dial-in access and the like. The central unit can request current configuration parameters of the cameras over the local network and send new configuration instructions to the cameras over the local network.

Now, the example shall comprise forty cameras, namely 10 cameras PLC1 to PLC10, which are to be used for surveillance of a parking lot of company premises, 20 cameras OfficeCam1 to OfficeCam20 for monitoring the offices, and 10 cameras at the service counters, SC1 to SC10. In FIGS. 2A and 2B and hereinafter, the cameras Office-Cam1 to Office Cam20 are abbreviated to OC1 to OC20.

In the Example, all cameras are to be adjustable with respect to their resolution "RES", the outputted frame rate FR and the set microphone sensitivity µ.

Possible values for the spatial image resolution RES are to be LOw or High, the frame rate FR is to be HIgh, MEDium or LOw, and the microphone sensitivityµ is to be High, LOw or OFF.

According to the target setting, all cameras PLC1 to PLC10 at the parking lot are to have the settings Res LO, µ HI and the frame rate MED, with the exception of camera PLC10 at a gate, where the frame rate is to be HI.

The cameras OC1 to OC20 are to have the setting RES HI, µ OFF and FR LOW. However, assume that one of the cameras OC9 is erroneously configured with a wrong microphone sensitivity µ LO.

The cameras in the service counter area SCC1 to SCC10 are to have the configuration Res HI, µHI, FR HI.

To check the present configuration, the following procedure is followed:

First, a workstation or the like is used for causing the configuration parameters of all cameras of the system to be retrieved and transmitted to the central unit. At the central unit, the configuration parameters retrieved are compared with a database wherein configuration parameters determined previously have been stored. Here, it should be ensured that no deviations exist, i.e. that no tampering or unauthorized interference has occurred.

Subsequently, the user requests that the cameras be displayed according to their microphone sensitivity. Here, a display is generated, cf. FIG. 2A, wherein all cameras used for the surveillance of the parking lot, PLC1 to PLC10 and the cameras in the service counter area SCC1 to SCC10 are listed under µHI.

In a second column, only camera OC9 is listed; in the third column which shows all cameras having a configuration with switched-off microphone, cameras OC1 to OC8 and OC10 to OC20 are shown.

The camera PLC10 which has a frame rate that deliberately deviates from that of other parking lot cameras, is surrounded by a line and the letters FR are shown at the surrounding line to indicate that the frame rate deviation is intentional.

An installation administrator checking the configuration will now immediately assume from the representation in FIG. 2A that camera OC9 has a wrong configuration with regard to microphone sensitivity and will click thereon and drag it into that group in which the other cameras of the office surveillance can already be found.

The corresponding action is first entered into an action database so that it could be reversed, if necessary, should the user have made a change in group assignment by error only.

Subsequently, a reconfiguration command is created by which the microphone sensitivity is changed. This reconfiguration command is sent to camera OC9.

Thereupon, the camera OC9 is immediately reconfigured (which is not absolutely necessary-alternatively, it would be possible to check the whole configuration before the reconfiguration of individual cameras is commanded).

The camera is now placed in the correct group because it has just been correctly (re)configured.

In this view, many further entries are found under the microphone sensitivity HI, because there are located both the cameras PLC1 to PLC10 keeping the parking lot under surveillance and also the cameras SCC1 to SCC10 keeping the service counter area under surveillance.

Now, the installation administrator will select a further parameter in order to check whether or not the cameras PLC1 to PLC10 and SCC1 to SCC10 differ in any other way with regard to their configuration.

For this purpose, he moves his mouse pointer over the field RES on the display and consequently obtains a separation of the respective groups formed for the given microphone sensitivity on the basis of image resolution. It is now found that all cameras SCC1 to SCC10 are configured for a high image resolution, as required, and all cameras PLC1 to PLC10 have low resolution, as required. Moreover, it can easily be ascertained that all office surveillance cameras OC1 to OC20, too, have the correct configuration, namely a high sensitivity.

Furthermore, it can be seen that the camera PLC10 is still surrounded by a line. When the frame rate is selected, this directs the attention of the installation administrator to the fact that the deviation given is intentional here. It should be noted that at the time of setting the configuration parameters it is possible, if necessary, to also store information for the later display of a particular configuration parameter to ensure that intentional deviations are remembered as such and need not be corrected. Here, it is also possible to simultaneously store a commentary or the like.

Upon completion of reconfiguration, the reconfiguration program is exited and the normal surveillance operation is continued with the checked system.

It should be noted that not only surveillance cameras can be configured in this way, but also, for example, cameras at door stations, communication units, etc.

The invention claimed is:

1. A method of configuring network-enabled cameras which are capable of being configured via a network with regard to a plurality of configuration parameters, the method comprising:

for each of a plurality of cameras accessible via the network, identifying current configuration parameter values;

detecting a first user input for a configuration parameter selection;

in response to the first user input for the configuration parameter selection, automatically forming a plurality of groups according to the identified current configuration parameter values associated with the configuration parameter selection;

dynamically assigning each of the cameras to one of the formed groups, said dynamically assigning to one of the groups being in accordance with the identified current configuration parameter values;

displaying, on a display, to the user, camera representations in accordance with the dynamically assigned groups of the cameras;

detecting a second user input for changing the dynamical assignment of one of the cameras from a first group to a second group of the formed groups;

in response to the second user input for changing the dynamical assignment of said one camera from the first group to the second group, automatically determining at least one configuration parameter that has to be changed based on the change in group assignment;

automatically generating a corresponding reconfiguration instruction in response to the second user input for changing the dynamical assignment of said one camera; and sending the reconfiguration instruction to said one camera via the network, wherein the operation of identifying current configuration parameter values for each of the plurality of cameras accessible via the network includes querying a current status of the configuration parameters from the cameras via the network and/or referring to a database in which previously determined configuration parameter values are stored, and wherein the configuration parameters include at least one of or a plurality of the following: light sensitivity, color temperature, PTZ parameters, playback volume of an integrated loudspeaker, sensitivity of an integrated microphone, geometric and/or achromatic image correction, IP address, frame rate, image resolution, alarm signal target for remote alarming, alarm-triggering conditions, type of alarm, storage location, storage frequency, storage format, network communication protocol, data format and a configuration parameter characterizing a camera response induced by a specified pattern of conditions being met.

2. The method according to claim 1, wherein, in order to display to the user the cameras according to their groupings, the camera groups are displayed on the display in a spaced apart relationship, as list elements presented via IP address, position or name and/or via a preview image, and a change in group assignment by clicking on a camera representation located in a spatial area and dragging and dropping the camera representation into another spatial area is enabled.

3. The method according to claim 2, wherein each said second user input for changing the dynamical assignment is stored in a memory, and each said second user input stored can be undone.

4. The method according to claim 3, wherein a number of configuration parameter values are determined, each of which is set to a default value when a corresponding one of the cameras is reassigned to another group.

5. The method according to claim 2, wherein at least four different groups are displayed simultaneously, according to the configuration parameter values of a configuration parameter tuple in the form of an ordered pair of configuration parameters, and/or wherein empty groups are displayed.

6. The method according to claim 2, wherein a number of configuration parameters values are determined, the values of which are not automatically changed when one of the cameras is reassigned to another group.

7. The method according to claim 6, wherein, in response to reassigning one of the cameras to another group, a user query is generated regarding whether a manual reconfiguration with respect to configuration parameters which are not automatically changed is required, or a third user input is allowed to determine whether a manual reconfiguration with respect to configuration parameters which are not automatically changed is required.

8. The method according to claim 2, wherein at least one configuration parameter assumes a plurality of discrete ordinal values, wherein a grouping for the at least one configuration parameter that assumes the plurality of discrete ordinal values is made by binning into ordinal value intervals such that a number of possible groups is smaller than the overall number of different discrete values, and/or wherein an undefined value is allowed for at least one configuration parameter.

9. The method according to claim 1, wherein the camera groups are displayed on the display differentiated by colored markings, and a change in group assignment by assigning a different marking color is allowed.

10. The method according to claim 9, wherein each said second user input for changing the dynamical assignment is stored in a memory, and each said second user input stored can be undone.

11. The method according to claim 10, wherein a number of configuration parameter values are determined, which are not changed when one of the cameras is reassigned to another group.

12. The method according to claim 10, wherein a number of configuration parameter values are determined, each of which is set to a default value when one of the cameras is reassigned to another group.

13. The method according to claim 12, wherein the groups are formed to which cameras are assigned only when the current configuration parameter values thereof match for more than one of their configuration parameters.

14. The method according to claim 13, wherein at least four different groups are displayed simultaneously on the display in a spaced apart relationship, according to the configuration parameter values of a configuration parameter tuple in the form of an ordered pair of configuration parameters, and/or wherein empty groups are displayed.

15. The method according to claim 1, wherein the operation of identifying current configuration parameter values for each of the plurality of cameras accessible via the network includes both referring to a database in which previously determined values have been stored and querying the current status of the parameters from the cameras via the network, and a comparison is made between the values retrieved from the data base and read out from the cameras for detecting unauthorized interventions.

16. The method according to claim 1,
wherein profiles are specified by the user, comprising a set of parameters that are to be simultaneously configured, and
wherein tuples of configuration parameter values lead to grouping.

17. The method according to claim 16, wherein, in order to display the user the cameras according to their groupings, the camera groups are displayed on the display in a spaced-apart relationship, as list elements presented via IP address, position or name, and/or via a preview image, and a change in group assignment by clicking on one of the camera representations located in a spatial area and dragging and dropping the camera representation into another spatial area is enabled.

18. The method according to claim 17,
wherein at least four different groups are displayed simultaneously, according to the configuration parameter values of a configuration parameter tuple in the form of an ordered pair of configuration parameters, and/or
wherein empty groups are displayed.

19. The method according to claim 16,
wherein at least one configuration parameter assumes a plurality of discrete ordinal values,
wherein a grouping for the at least one configuration parameter that assumes the plurality of discrete ordinal values is made by binning into ordinal value intervals such that a number of possible groups is smaller than the overall number of different discrete values, and/or
wherein an undefined value is allowed for at least one configuration parameter.

20. A method of configuring network-enabled cameras which are capable of being configured via a network with regard to a plurality of configuration parameters, the method comprising:
for each of a plurality of cameras accessible via the network, identifying current configuration parameter values;
detecting a first user input for a configuration parameter selection;
in response to the first user input for the configuration parameter selection, automatically forming a plurality of groups according to the identified current configuration parameter values associated with the configuration parameter selection;
dynamically assigning each of the cameras to one of the formed groups, said dynamically assigning to one of the groups being in accordance with the identified current configuration parameter values;
displaying, on a display, to the user, camera representations in accordance with the dynamically assigned groups of the cameras;
detecting a second user input for changing the dynamical assignment of one of the cameras from a first group to a second group of the formed groups;
in response to the second user input for changing the dynamical assignment of said one camera from the first group to the second group, automatically determining at least one configuration parameter that has to be changed based on the change in group assignment;
automatically generating a corresponding reconfiguration instruction in response to the second user input for changing the dynamical assignment of said one camera;
sending the reconfiguration instruction to said one camera via the network; and
automatically determining for a given first configuration parameter (K1) whether, on the one hand, all cameras in which this first configuration parameter (K1) has a first matching value (IW1K1) also match with respect to a value (IW1K2) of another, second configuration parameter (K2), while, on the other hand, cameras exist in which the first configuration parameter (K1) does not have the first value (IW1K1), but has the value (IW2K1), among each other likewise have the same value (IW2K2) with respect to the second configuration parameter (K2), but in which the value (IW2K2) differs from the value (IW1K2) of the second configuration value (K2) in the cameras having the first value (IW1K1) of the first configuration parameter, so as to thereby determine whether in view of a change of the value of the first configuration parameter (K1) a change of the value of the second configuration parameter (K2) is advised as well and/or for forming profiles of configuration parameters.

21. A method of configuring network-enabled cameras which are capable of being configured via a network with regard to a plurality of configuration parameters, the method comprising:
for each of a plurality of cameras accessible via the network, identifying current configuration parameter values;
detecting a first user input for a configuration parameter selection;
in response to the first user input for the configuration parameter selection, automatically forming a plurality of groups according to the identified current configuration parameter values associated with the configuration parameter selection;
dynamically assigning each of the cameras to one of the formed groups, said dynamically assigning to one of the groups being in accordance with the identified current configuration parameter values;
displaying, on a display, to the user, camera representations in accordance with the dynamically assigned groups of the cameras;
detecting a second user input for changing the dynamical assignment of one of the cameras from a first group to a second group of the formed groups;
in response to the second user input for changing the dynamical assignment of said one camera from the first group to the second group, automatically determining at least one configuration parameter that has to be changed based on the change in group assignment;
automatically generating a corresponding reconfiguration instruction in response to the second user input for changing the dynamical assignment of said one camera;
sending the reconfiguration instruction to said one camera via the network; and
evaluating in particular by evaluation of a user specification, with respect to a given first configuration parameter (K1), whether, on the one hand, all cameras in which this first configuration parameter (K1) has a first matching value (SW1K1), should also match with respect to the value (SW1K2) of another, second configuration parameter (K2), while, on the other hand, cameras in which the first configuration parameter (K1) does not have the first value (SW1K1), but has the value (SW2K1), should also have matching values (SW2K2) with respect to the second configuration parameter (K2), but that the value (SW2K2) should differ from the value (SW1K2) of the second configuration value (K2) in the cameras having the first value (SW1K1) of the first configuration parameter, in order to determine thereby whether changing the value of the first configuration parameter (K1) makes changing of the value of the second configuration parameter (K2) advisable as well, and/or to form profiles of configuration parameters.

22. A method of configuring network-enabled cameras which are capable of being configured via a network with regard to a plurality of parameters, the method comprising:
determining, by a Central Unit, values with respect to a plurality of configuration parameters for each of a plurality of cameras accessible via the network;
forming camera groups among the plurality of cameras accessible via the network based on the configuration parameter values;
displaying the cameras to a user in accordance with the group assignment;
detecting a user input for changing the assignment of a camera from a first group to a second group;
automatically generating, in response to the user input, a reconfiguration instruction for changing at least one configuration parameter based on the change in group assignment;
sending the reconfiguration instruction to the camera via the network; and
automatically determining for a given first configuration parameter (K1) whether, on the one hand, all cameras in which this first configuration parameter (K1) has a first matching value (IW1K1) also match with respect to the value (IW1K2) of another, second configuration parameter (K2), while, on the other hand, cameras exist in which the first configuration parameter (K1) does not have the first value (IW1K1), but has the value (IW2K1), among each other likewise have the same value (IW2K2) with respect to the second configuration parameter (K2), but in which the value (IW2K2) differs from the value (IW1K2) of the second configuration value (K2) in the cameras having the first value (IW1K1) of the first configuration parameter, so as to thereby determine whether in view of a change of the value of the first configuration parameter (K1) a change of the value of the second configuration parameter (K2) is advised as well and/or for forming profiles of configuration parameters.

23. A method of configuring network-enabled cameras which are capable of being configured via a network with regard to a plurality of parameters, the method comprising:
determining, by a Central Unit, values with respect to a plurality of configuration parameters for each of a plurality of cameras accessible via the network;
forming camera groups among the plurality of cameras accessible via the network based on the configuration parameter values;
displaying the cameras to a user in accordance with the group assignment;
detecting a user input for changing the assignment of a camera from a first group to a second group;
automatically generating, in response to the user input, a reconfiguration instruction for changing at least one configuration parameter based on the change in group assignment;
sending the reconfiguration instruction to the camera via the network; and
evaluating in particular by evaluation of a user specification, with respect to a given first configuration parameter (K1), whether, on the one hand, all cameras in which this first configuration parameter (K1) has a first matching value (SW1K1), should also match with respect to the value (SW1K2) of another, second configuration parameter (K2), while, on the other hand, cameras in which the first configuration parameter (K1) does not have the first value (SW1K1), but has the value (SW2K1), should also have matching values (SW2K2) with respect to the second configuration parameter (K2), but that the value (SW2K2) should differ from the value (SW1K2) of the second configuration value (K2) in the cameras having the first value (SW1K1) of the first configuration parameter, in order to determine thereby whether changing the value of the first configuration parameter (K1) makes changing of the value of the second configuration parameter (K2) advisable as well, and/or to form profiles of configuration parameters.

* * * * *